(12) United States Patent
Nakamura

(10) Patent No.: US 12,330,361 B2
(45) Date of Patent: Jun. 17, 2025

(54) MAINTENANCE METHOD FOR INJECTION MOLDING MACHINE, INJECTION MOLDING UNIT, AND MAINTENANCE JIG FOR INJECTION MOLDING MACHINE

(71) Applicant: FANUC CORPORATION, Yamanashi (JP)

(72) Inventor: Kyousuke Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 182 days.

(21) Appl. No.: 17/998,145

(22) PCT Filed: Jun. 25, 2021

(86) PCT No.: PCT/JP2021/024140
§ 371 (c)(1),
(2) Date: Nov. 7, 2022

(87) PCT Pub. No.: WO2022/004592
PCT Pub. Date: Jan. 6, 2022

(65) Prior Publication Data
US 2023/0211533 A1 Jul. 6, 2023

(30) Foreign Application Priority Data
Jul. 2, 2020 (JP) ................................ 2020-114787

(51) Int. Cl.
*B29C 45/84* (2006.01)
*B29C 45/50* (2006.01)
(52) U.S. Cl.
CPC .............. *B29C 45/84* (2013.01); *B29C 45/50* (2013.01)
(58) Field of Classification Search
CPC ......... B29C 45/84; B29C 45/50; B29C 45/47; B29C 45/17
See application file for complete search history.

(56) References Cited

U.S. PATENT DOCUMENTS

| 2013/0101692 A1* | 4/2013 | Asaoka | B29C 45/60 425/150 |
| 2016/0129617 A1* | 5/2016 | Asaoka | B29C 45/50 425/574 |

FOREIGN PATENT DOCUMENTS

| DE | 691 06 194 T2 | 6/1995 |
| JP | H03-213321 A | 9/1991 |
| JP | 2013-086384 A | 5/2013 |

OTHER PUBLICATIONS

International Search Report issued in PCT/JP2021/024140; mailed Jul. 20, 2021.

(Continued)

*Primary Examiner* — Alison L Hindenlang
*Assistant Examiner* — Erica Hartsell Funk
(74) *Attorney, Agent, or Firm* — Studebaker Brackett PLLC

(57) ABSTRACT

To reliably and safely suppress co-rotation of a screw drive unit when performing a tightening and loosening operation for a threaded fastener which fixes a screw to the screw drive unit. Provided is an injection molding machine 2 in which a threaded fastener 30 is tightened into a first threaded portion 23a of a screw drive unit 21, thereby fixing a screw 10 to the screw drive unit 21 through a fixation bush 25, wherein a jig 40, which is detachably mounted on the screw drive unit 21, and is brought into contact with a main body contact portion 4 of a main body portion 3 of the injection molding machine 2 by rotating the screw drive unit 21 to restrict further rotation of the screw drive unit 21, is mounted on the screw drive unit 21, and the threaded fastener 30 is tightened or loosened with respect to the first threaded portion 23a with the jig 40 in contact with the main body contact portion 4.

9 Claims, 8 Drawing Sheets

(56) References Cited

OTHER PUBLICATIONS

Schrauben-Lexikon; "Taper pins with threaded pin, constant pin lengths, taper 1:50 DIN 7977"; total 4 pages; Wegertseder; https://www.schrauben-lexikon.de/norm/DIN_7977.asp; Feb. 17, 2025 12:30:21.

* cited by examiner

MAINTENANCE METHOD FOR INJECTION MOLDING MACHINE, INJECTION MOLDING UNIT, AND MAINTENANCE JIG FOR INJECTION MOLDING MACHINE

TECHNICAL FIELD

The present invention relates to a maintenance method for an injection molding machine, an injection molding unit, and a maintenance jig for an injection molding machine.

BACKGROUND ART

In a conventional injection molding machine, a screw inserted into a barrel filled with resin is rotationally driven, advanced and retracted in an axial direction by a screw drive unit. For such an injection molding machine, a structure is known in which the screw is detachably fixed to the screw drive unit with a plurality of bolts. For example, Patent Document 1 discloses a structure in which a fixation bush that is splined to a screw is fixed to a front end portion of a screw drive unit with a plurality of bolts (see, for example, Patent Document 1).

The screw of the injection molding machine is detached from and attached to the screw drive unit when cleaning, replacement, or the like is performed, whereby maintenance is performed. In the injection molding machine as described in Patent Document 1, when the screw is attached to or detached from the screw drive unit, the bolts with which the fixation bush is fixed to the screw drive unit are removed or tightened. Since the bolts are rotatable about an axis parallel to a rotation axis of the screw drive unit, a phenomenon occurs in which the screw drive unit co-rotates due to transmission of a force that rotates the bolts to the screw drive unit. To address this, in a conventional case where, for example, a pulley is connected to the screw drive unit via a belt, operation for tightening and loosening the bolts is performed in a state where a foreign material such as a rag is interposed between the belt and the pulley to forcibly stop the rotation of the screw drive unit.

Patent Document 1: Japanese Unexamined Patent Application, Publication No. 2013-086384

DISCLOSURE OF THE INVENTION

Problems to be Solved by the Invention

However, the above method is only a provisional measure and is insufficient in terms of safety. Therefore, there is a demand for a technique for reliably and safely preventing or reducing co-rotation of a screw drive unit when tightening and loosening a threaded fastener such as a bolt with which a screw is fixed to the screw drive unit.

Means for Solving the Problems

One aspect of the present disclosure is directed to a maintenance method for an injection molding machine including a main body, a screw for injection molding, a screw drive unit that is rotatably supported on the main body and configured to at least rotationally drive the screw, a fixation bush that fixes the screw to the screw drive unit, and a threaded fastener that is rotatable about an axis substantially parallel to a rotation axis of the screw drive unit and tightened into a first threaded portion provided in the screw drive unit, the screw being fixed to the screw drive unit through the fixation bush by the threaded fastener tightened into the first threaded portion. The maintenance method includes: mounting a jig that is detachably mountable on the screw drive unit, the jig being configured to come into contact with a main body contact portion of the main body by rotation of the screw drive unit and to restrict further rotation of the screw drive unit; and tightening and loosening the threaded fastener with respect to the first threaded portion while the jig is in contact with the main body contact portion. Note that "substantially parallel" used in the present disclosure is not limited to being strictly parallel but encompasses being approximate to parallel in a range in which functions and effects of the present disclosure can be achieved.

One aspect of the present disclosure is directed to a maintenance method for an injection molding machine including a main body, a screw for injection molding, a screw drive unit that is rotatably supported on the main body and configured to at least rotationally drive the screw, and a fixation bush that fixes the screw to the screw drive unit, the screw including a screw body that engages with the fixation bush so as to rotate integrally with the fixation bush, the screw body being connected to the screw drive unit, and a screw head that is rotatable about an axis substantially parallel to a rotation axis of the screw body and tightened into a second threaded portion provided in an end portion of the screw body. The maintenance method includes: mounting a jig that is detachably mountable on the fixation bush, the jig being configured to come into contact with a main body contact portion of the main body by rotation of the fixation bush and to restrict further rotation of the fixation bush; and disconnecting the fixation bush from the screw drive unit and tightening and loosening the screw head with respect to the second threaded portion while the jig is in contact with the main body contact portion.

One aspect of the present disclosure is directed to an injection molding unit including a main body, a screw for injection molding, a screw drive unit that is rotatably supported on the main body and configured to at least rotationally drive the screw, a fixation bush that fixes the screw to the screw drive unit, a threaded fastener that is rotatable about an axis substantially parallel to a rotation axis of the screw drive unit and tightened into a first threaded portion provided in the screw drive unit, the threaded fastener being rotated in a tightening direction to fix the screw to the screw drive unit through the fixation bush, and a jig that is detachably mountable on the screw drive unit, the jig being configured to come into contact with a main body contact portion of the main body by rotation of the screw drive unit and to restrict further rotation of the screw drive unit, the screw drive unit including a receiving portion on which the jig is detachably mounted.

One aspect of the present disclosure is directed to an injection molding unit including a main body, a screw for injection molding, a screw drive unit that is rotatably supported on the main body and configured to at least rotationally drive the screw, and a fixation bush that fixes the screw to the screw drive unit, the screw including: a screw body that engages with the fixation bush so as to rotate integrally with the fixation bush, the screw body being connected to the screw drive unit, and a screw head that is rotatable about an axis substantially parallel to a rotation axis of the screw body, and tightened into a second threaded portion provided in an end portion of the screw body, the injection molding unit further including a jig that is detachably mountable on the fixation bush, the jig being configured to come into contact with a main body contact portion of the main body by rotation of the fixation bush and to restrict further rotation of the fixation bush, the fixation bush including a receiving portion on which the jig is detachably mounted.

One aspect of the present disclosure is directed to a maintenance jig for an injection molding machine, the maintenance jig being provided to the injection molding machine including a main body, a screw for injection molding, a screw drive unit that is rotatably supported on the main body and configured to at least rotationally drive the screw, a fixation bush that fixes the screw to the screw drive unit, and a threaded fastener that is rotatable about an axis substantially parallel to a rotation axis of the screw drive unit, and tightened into a first threaded portion provided in the screw drive unit, the screw being fixed to the screw drive unit by tightening the fixation bush to the first threaded portion with the threaded fastener. The maintenance jig includes: a mountable portion that is detachably mountable on a receiving portion provided in the screw drive unit; and a restricting portion that extends from the mountable portion, the restricting portion configured to come into contact with a main body contact portion of the main body by rotation of the screw drive unit and to restrict further rotation of the screw drive unit.

One aspect of the present disclosure is directed to a maintenance jig for an injection molding machine, the maintenance jig being provided to the injection molding machine including a main body, a screw for injection molding, a screw drive unit that is rotatably supported on the main body and configured to at least rotationally drive the screw, and a fixation bush that fixes the screw to the screw drive unit, the screw including a screw body that engages with the fixation bush so as to rotate integrally with the fixation bush, the screw body being connected to the screw drive unit, and a screw head that is rotatable about an axis substantially parallel to a rotation axis of the screw body, and tightened into a second threaded portion provided in an end portion of the screw body. The maintenance jig includes: a mountable portion that is detachably mountable on a receiving portion provided in the fixation bush, and a restricting portion that extends from the mountable portion, the restricting portion configured to come into contact with a main body contact portion of the main body by rotation of the fixation bush and to restrict further rotation of the fixation bush.

Effects of the Invention

One aspect makes it possible to reliably and safely reduce or prevent co-rotation of the screw drive unit when tightening and loosening the threaded fastener with which the screw is fixed to the screw drive unit.

PREFERRED MODE FOR CARRYING OUT THE INVENTION

Figure 1:
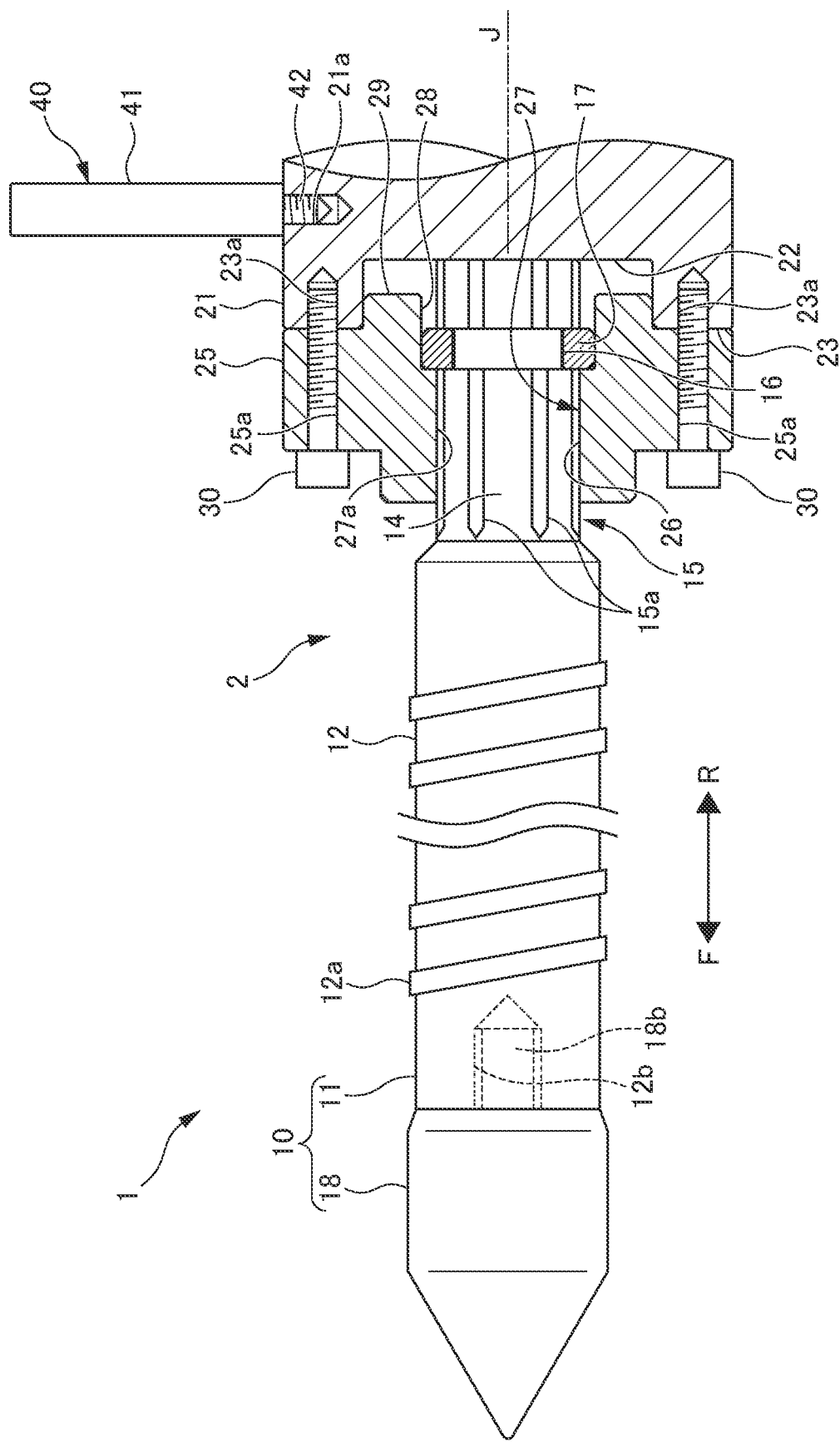
FIG. 1 is a side view schematically showing a part of an injection molding unit according to an embodiment of the present disclosure, specifically, showing a coupled portion between a screw and a screw drive unit partially in a cross section.
Figure 2:
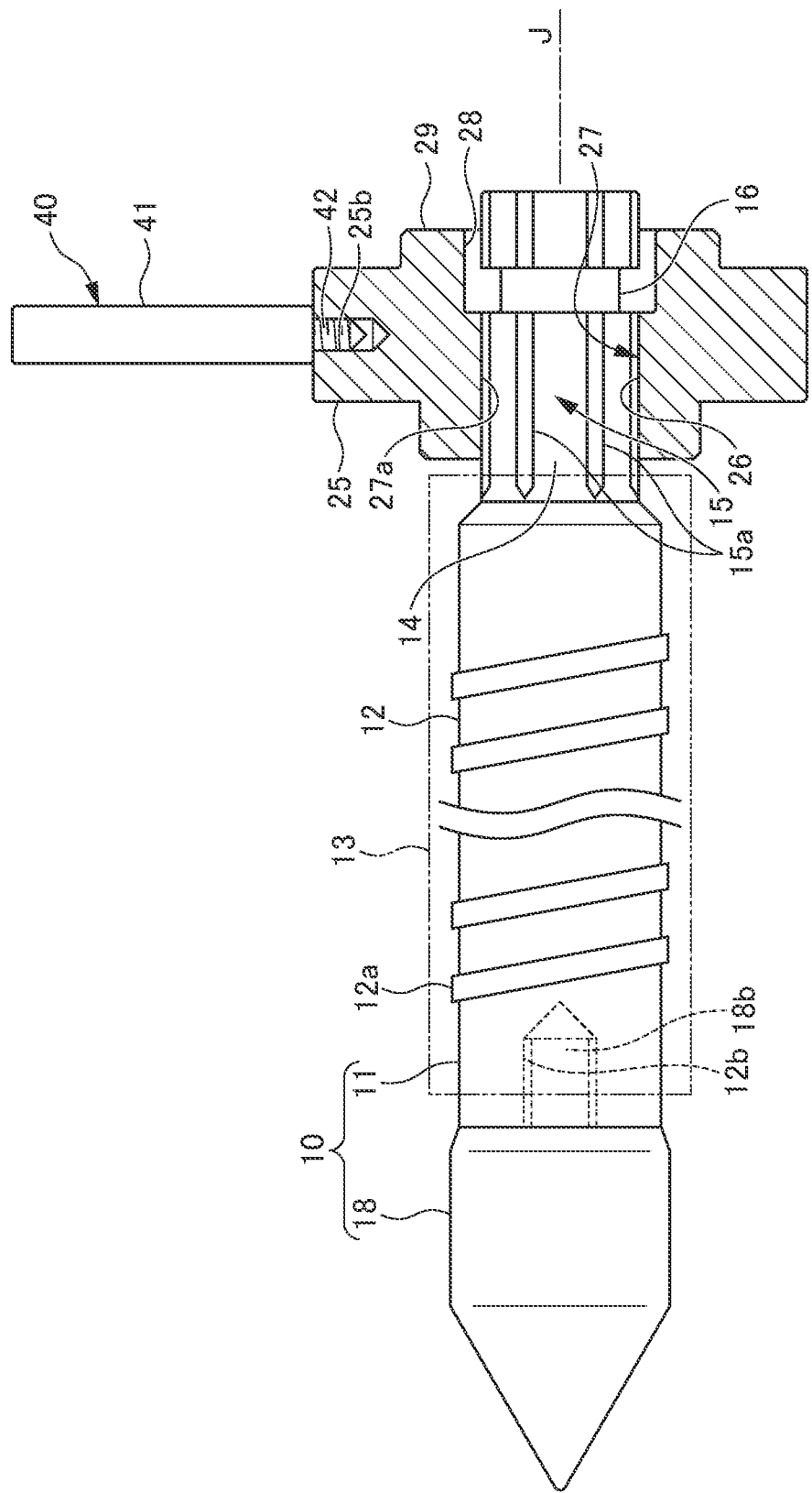
FIG. 2 is a side view showing a state where a maintenance jig according to the embodiment of the present disclosure is mounted on a fixation bush.
Figure 3:
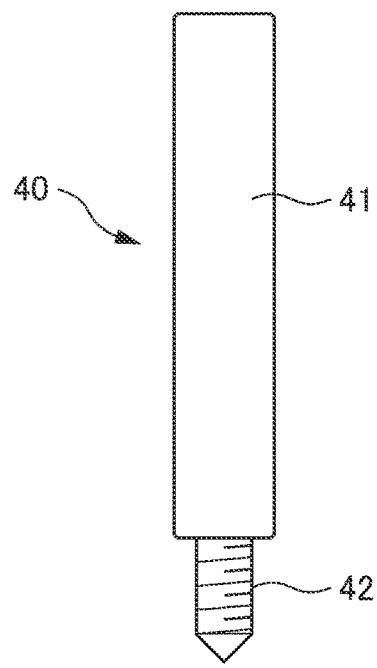
FIG. 3 is a side view showing the maintenance jig according to the embodiment of the present disclosure.
Figure 4:
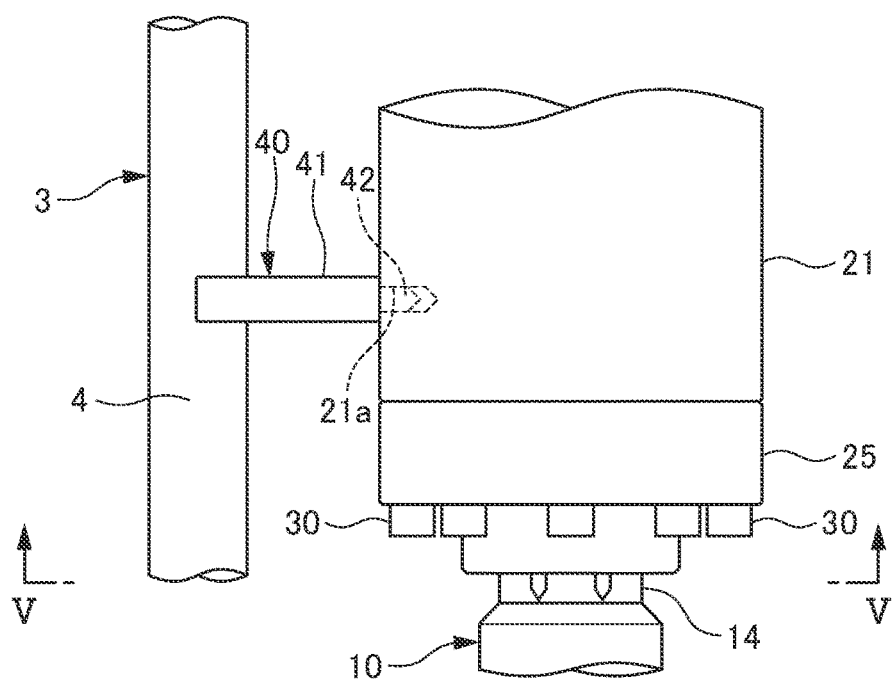
FIG. 4 is a plan view showing a state where the maintenance jig mounted on the screw drive unit according to the embodiment of the present disclosure is in contact with a main body of an injection molding machine.
Figure 5:
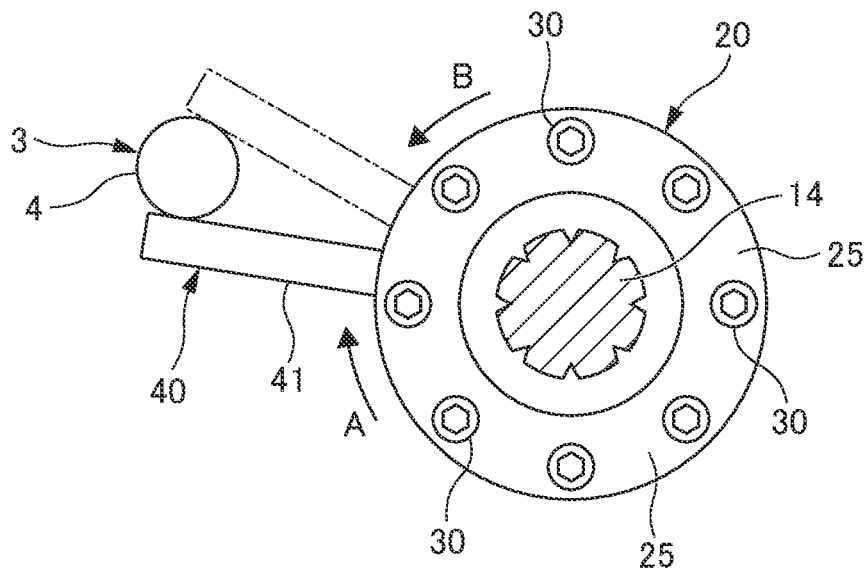
FIG. 5 is a cross-sectional view along arrows V-V of FIG. 4.

Embodiments of the present disclosure will be described below with reference to the drawings. FIG. 1 shows an injection molding unit 1 according to an embodiment. FIG. 2 shows a screw 10, a fixation bush 25, and other components provided in the injection molding unit 1 according to the embodiment. FIG. 3 shows a maintenance jig (hereinafter simply abbreviated as "the jig") 40 provided in the injection molding unit 1. As shown in FIG. 1, the injection molding unit 1 includes an injection molding machine 2 and the jig 40. As shown in FIGS. 4 and 5, the injection molding machine 2 includes a main body 3. The main body 3 is a stationary portion that supports movable parts such as the screw 10 and a screw drive unit 21 provided in the injection molding machine 2. The screw 10 and the screw drive unit 21 will be described later. FIGS. 4 and 5 show a frame 4 as a portion constituting a part of the main body 3. A part of the frame 4 functions as an example of a main body contact portion.

FIG. 1 shows a part of the injection molding machine 2. The injection molding machine 2 includes the columnar screw 10, the columnar screw drive unit 21 that rotates the screw 10 and advances and retracts the screw 10 in an axial direction (an axis extending in the axial direction is referred to as "the rotation axis J"), the fixation bush 25, and a plurality of bolts 30. Each bolt 30 is an example of a threaded fastener. The screw 10 is driven by the screw drive unit 21 to rotate about the axis and to advance in a forward direction F or retract in a rearward direction R in FIG. 1. The screw drive unit 21 is provided to the main body 3 such that the screw drive unit 21 is rotatable and movable in the forward and rearward directions. In the following description, the direction relating to the front and rear conforms to an advancing direction and a retracting direction of the screw 10.

The screw 10 includes a screw body 11 and a screw head 18 that is detachably attached to an end of the screw body 11.

The screw body 11 includes a main body 12 inserted into a barrel (not shown), and a base end portion 14 integrated with a rear end portion of the main body 12. On an outer peripheral surface of the main body 12, a spiral ridge 12a is formed. A internally threaded portion 12b for fixing the screw head 18 is formed in an axial center of a front end face of the main body 12. The internally threaded portion 12b is an example of a second threaded portion.

The base end portion 14 is smaller in diameter than the main body 12 and is coaxial with the main body 12. The base end portion 14 includes a spline portion 15 and a retainer fitting groove 16. The spline portion 15 includes a plurality of grooves 15a formed in an outer peripheral surface of the base end portion 14 and extending in the axial direction. The retainer fitting groove 16 is a circumferential groove that has a certain depth and is formed over an entire circumference of the outer peripheral surface of the base end portion 14. A retainer 17 is fitted into the retainer fitting groove 16. The retainer 17 is constituted by combining two half bodies dividable in a radial direction. The base end portion 14 of the screw 10 is detachably and coaxially fixed to the screw drive unit 21.

The screw head 18 is coaxially fixed to the screw body 11. An externally threaded portion 18b is formed at an axial center of a rear end face of the screw head 18. The externally threaded portion 18b is tightened into the internally threaded portion 12b of the screw body 11. The screw head 18 is coaxially fastened to the screw body by tightening the externally threaded portion 18b into the internally threaded portion 12b. The externally threaded portion 18b is left-handed having a rotating direction for tightening which is opposite to a direction of a common threaded fastener. The internally threaded portion 12b is provided in correspondence with the externally threaded portion 18b so that the externally threaded portion 18b is tightened into the internally threaded portion 12b.

The screw drive unit 21 rotates, advances, and retracts by being driven by a drive source (not shown) such as a motor. A recess 22 is formed in a central portion of a front end face of the screw drive unit 21. Around the recess 22, an annular protrusion 23 protruding forward is formed. A plurality of internally threaded portions 23a is formed in a front end face of the annular protrusion 23 at intervals in a circumferential direction. The internally threaded portion 23a is an example of a first threaded portion. A internally threaded portion 21a into which the jig 40 is tightened and mounted is formed at a predetermined location of an outer peripheral surface of the screw drive unit 21. The internally threaded portion 21a is an example of a receiving portion provided in the screw drive unit 21.

The fixation bush 25 is detachably coupled to a front side of the screw drive unit 21. The fixation bush 25 includes a through hole 26 extending through an axial center, and a spline portion 27 of the through hole 26. The spline portion 27 includes a plurality of ridges 27a formed on an inner peripheral surface of the through hole 26 and extending in the axial direction. The plurality of ridges 27a is fitted into the plurality of grooves 15a of the spline portion 15 on a one-to-one basis. In this way, the spline portion 27 is fitted to the spline portion 15 of the screw 10.

On a rear end face of the fixation bush 25, a retainer fitting hole 28 having a diameter slightly larger than that of the through hole 26 is formed concentrically with the through hole 26. Around the retainer fitting hole 28, an annular protrusion 29 protruding rearward is formed. The annular protrusion 29 is fitted into the recess 22 of the screw drive unit 21. A plurality of bolts insertion holes 25a extending in the axial direction penetrates through the fixation bush 25. The plurality of bolts insertion holes 25a are formed at positions corresponding to the plurality of internally threaded portions 23a of the screw drive unit 21.

As shown in FIG. 2, a internally threaded portion 25b (not shown in FIG. 1) into which the jig 40 is tightened and mounted is formed at a predetermined location of an outer peripheral surface of the fixation bush 25. The internally threaded portion 25b is an example of a receiving portion provided in the fixation bush 25. The screw 10 is inserted into a barrel 13 filled with a resin.

The plurality of bolts 30 fixes the fixation bush 25 to the screw drive unit 21, thereby fixing the screw 10 to the screw drive unit 21. Each of the plurality of the bolts 30 is inserted from a front side into each bolt insertion hole 25a of the fixation bush 25 and tightened into each internally threaded portion 23a of the screw drive unit 21. The bolt 30 is, for example, a bolt with a hexagonal hole. Each bolt 30 rotates about an axis substantially parallel to the rotation axis J of the screw drive unit 21 and is tightened into each internally threaded portion 23a.

The fixation bush 25 includes a retainer insertion hole (not shown) into which the retainer 17 is inserted from outside. The retainer insertion hole extends through an inner peripheral surface of the retainer fitting hole 28 from the outer peripheral surface of the fixation bush 25.

The base end portion 14 extends through the through hole 26 of the fixation bush 25, the spline portion 15 is fitted to the spline portion 27, the retainer 17 is inserted into the above-mentioned retainer insertion hole and fitted into the retainer fitting groove 16, and the fixation bush 25 is fixed to the screw drive unit 21, thereby fixing the screw 10 to the screw drive unit 21. The fixation bush 25 is fastened by fitting the annular protrusion 29 into the recess 22 and tightening, into each internally threaded portion 23a of the screw drive unit 21, each bolt 30 inserted into each of the plurality of the bolts insertion holes 25a. An end face of the base end portion 14 of the screw 10 abuts onto a bottom surface of the recess 22 of the screw drive unit 21.

The screw 10 is rotated integrally with the rotating screw drive unit 21 and fixation bush 25 due to the spline portion 15 fitted to the spline portion 27 of the fixation bush 25. To the screw 10, the advancing of the screw drive unit 21 is transmitted via the base end portion 14 and the retainer 17, and the retracting of the screw drive unit 21 is transmitted via the retainer 17.

As shown in FIGS. 1 and 2, the jig 40 is detachably mounted on the internally threaded portion 21a of the screw drive unit 21 or the internally threaded portion 25b of the fixation bush 25. As shown in FIG. 3, the jig 40 includes a columnar rod portion 41 and an externally threaded portion 42 provided at one end of the rod portion 41. The rod portion 41 is an example of a restricting portion. The externally threaded portion 42 is an example of a mountable portion.

The externally threaded portion 42 is detachably tightened and mounted into the internally threaded portion 21a of the screw drive unit 21 or the internally threaded portion 25b of the fixation bush 25. Tightening the externally threaded portion 42 into the internally threaded portion 21a of the screw drive unit 21 causes the jig 40 to be fastened to the screw drive unit 21. On the other hand, loosening the externally threaded portion 42 to remove the same from the internally threaded portion 21a causes the jig 40 to be detached from the screw drive unit 21. The rod portion 41 of the jig 40 mounted on the screw drive unit 21 extends in a direction intersecting with the axial direction of the screw drive unit 21, that is, in a radial direction of the screw drive unit 21, or in a direction approximate to the radial direction.

Tightening the externally threaded portion 42 into the internally threaded portion 25b of the fixation bush 25 causes the jig 40 to be fastened to the fixation bush 25.

Loosening the externally threaded portion 42 to remove the same from the internally threaded portion 25b causes the jig 40 to be detached from the fixation bush 25. The rod portion 41 of the jig 40 mounted on the fixation bush 25 extends in a direction intersecting with the axial direction of the fixation bush 25, that is, in a radial direction of the fixation bush 25 or in a direction approximate to the radial direction.

As shown in FIGS. 4 and 5, when the screw drive unit 21 in an undriven state is manually rotated by handling the jig 40 mounted on the screw drive unit 21, the rod portion 41 comes into contact with the frame 4 of the main body 3 provided in the injection molding machine 2. In FIG. 5, when the screw drive unit 21 rotates clockwise as indicated by the arrow A, the rod portion 41 comes into contact with the frame 4 from below. On the other hand, when the screw drive unit 21 rotates counterclockwise as indicated by the arrow B, the rod portion 41 comes into contact with the frame 4 from above. When the rod portion 41 comes into contact with the frame 4, the screw drive unit 21 is restricted from further rotation.

Figure 6:
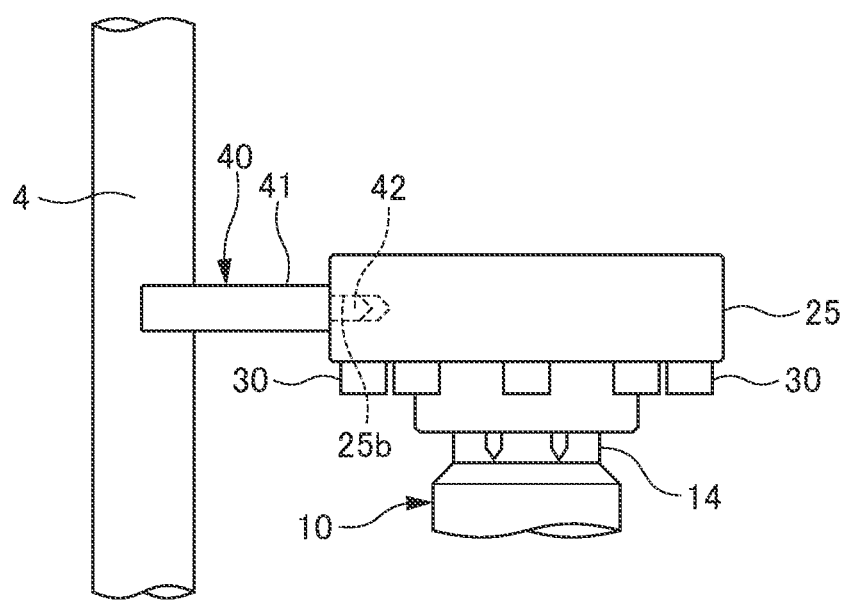
FIG. 6 is a plan view showing a state where the maintenance jig mounted on the fixation bush according to the embodiment of the present disclosure is in contact with the main body of the injection molding machine.

Further, as shown in FIG. 6, when the screw 10 is rotated in a state where the jig 40 is mounted into the internally threaded portion 25b of the fixation bush 25, the rod portion 41 comes into contact with the frame 4 of the main body 3 of the injection molding machine 2. As in the case of the screw drive unit 21, when the screw 10 rotates clockwise as indicated by the arrow A in FIG. 5, the rod portion 41 comes into contact with the frame 4 from below, and when the screw rotates counterclockwise as indicated by the arrow B, the rod portion 41 comes into contact with the frame 4 from above. When the rod portion 41 comes into contact with the frame 4, the screw 10 is restricted from further rotation.

The injection molding unit 1 according to the present embodiment has the configuration described above. For the injection molding machine 2, maintenance is performed by removing the screw 10 fixed to and removed from the screw drive unit 21. Further, for the screw 10 fixed to the injection molding machine 2, maintenance by fixing and removing the screw head 18 to and from the screw body 11. Hereinafter, an example of a method for these maintenances according to the present embodiment will be described.

To fix the screw 10 to the screw drive unit 21, the jig 40 is first mounted on the screw drive unit 21. The jig 40 is fastened to the screw drive unit 21 by tightening the externally threaded portion 42 into the internally threaded portion 21a of the screw drive unit 21.

Next, the screw 10 is fixed to the screw drive unit 21. To fix the screw 10 to the screw drive unit 21, the base end portion 14 is passed through the through hole 26 of the fixation bush 25, and the spline portion 15 is fitted to the spline portion 27. Next, the fixation bush 25 is fixed to the screw drive unit 21, and the retainer 17 is fitted into the retainer fitting groove 16.

By fitting the annular protrusion 29 into the recess 22 of the screw drive unit 21 and tightening and fastening, into each internally threaded portion 23a of the screw drive unit 21, each bolt 30 inserted into each of the plurality of the bolts insertion holes 25a, the fixation bush 25 is fixed to the screw drive unit 21. Thereby, the screw 10 is fixed to the screw drive unit 21. The bolt 30 can be tightened, for example, with a hexagonal wrench.

To tighten the bolt 30 into the internally threaded portion 23a and tightened, the bolt 30 is rotated clockwise (in the right-handed direction; the direction of the arrow A direction) in FIG. 5. At this time, the rod portion 41 of the jig 40 is brought into contact with the frame 4 of the main body of the injection molding machine 2 from below. When the bolt 30 is rotated in a tightening direction, a rotational force is transmitted to the screw drive unit 21, and a phenomenon can occur in which the screw drive unit 21 co-rotates. In contrast, in the present embodiment, since the rod portion 41 of the jig 40 is in contact with the frame 4 to restrict further rotation, the co-rotation of the screw drive unit 21 is prevented or reduced. For this reason, when the bolt 30 is to be tightened, a counterforce can be sufficiently received from the frame 4 via the rod portion 41, and the bolt 30 can be smoothly and sufficiently tightened without being bothered by the co-rotation. Once the screw 10 is fixed to the screw drive unit 21, before the injection molding machine 2 is operated, the jig 40 is removed from the screw drive unit 21.

To remove the screw 10 from the screw drive unit 21, each of the plurality of the bolts 30 is loosened and removed from each internally threaded portion 23a of the screw drive unit 21. The fixation bush 25 is detached from the screw drive unit 21, and the retainer 17 is removed from the retainer fitting groove 16.

To loosen the bolt 30 fastened to the internally threaded portion 23a, the bolt 30 is rotated counterclockwise (in the left-handed direction; the direction of the arrow B direction) in FIG. 5. At this time, the rod portion 41 of the jig 40 is brought into contact with the frame 4 of the main body of the injection molding machine 2 from above. Upon rotating the bolt 30 in a loosening direction, the rotational force is transmitted to the screw drive unit 21, and a phenomenon can occur in which the screw drive unit 21 co-rotates. In contrast, in the present embodiment, since the rod portion 41 of the jig 40 is in contact with the frame 4 to restrict further rotation, the co-rotation of the screw drive unit 21 is prevented or reduced. For this reason, when the bolt 30 is to be loosened, the counterforce can be sufficiently received from the frame 4 via the rod portion 41, and the bolt 30 can be smoothly loosened without being bothered by the co-rotation.

Next, a method of detaching, from the screw body 11, the screw head 18 of the screw 10 fixed to the injection molding machine 2 will be described. To detach the screw head 18, the bolt 30 is removed from the screw drive unit 21 and the fixation bush 25 is disconnected from the screw drive unit 21, and as shown in FIG. 2, the screw 10 is inserted into the barrel 13 and the screw head 18 is exposed from the barrel 13. Next, as shown in FIG. 2, the jig 40 is attached anew to the internally threaded portion 25b of the fixation bush 25.

To remove the screw head 18, the screw head 18 is rotated in a direction in which the externally threaded portion 18b loosens: specifically, since the externally threaded portion 18b is left-handed as described above, the screw head 18 is rotated in the direction of the arrow A opposite to the tightening direction in FIG. 5. At this time, the rotational force in the loosening direction is transmitted to the screw body 11, and the screw body 11 co-rotates. When the screw body 11 co-rotates in the A direction in FIG. 5, the rod portion 41 of the jig 40 comes into contact with the frame 4 from below, and the rotation of the screw body 11 in the direction of the arrow A is restricted. When the screw head 18 is rotated in the loosening direction in this state, only the screw head 18 rotates, so that the externally threaded portion 18b is removed from the internally threaded portion 12b and the screw head 18 is detached. When the screw head 18 is to be loosened, the counterforce can be sufficiently received from the frame 4 via the rod portion 41, and the screw head 18 can be smoothly removed without being bothered by the co-rotation.

To attach the screw head 18 to the screw body 11, the screw head 18 is rotated in the direction of the arrow B in FIG. 5, and the externally threaded portion 18b is tightened into the internally threaded portion 12b of the screw body 11 and tightened. At this time, the rotational force in the tightening direction is transmitted to the screw body 11, and the screw body 11 co-rotates. When the screw body 11 co-rotates in the B direction in FIG. 5, the rod portion 41 of the jig 40 comes into contact with the frame 4 from above, and the rotation of the screw body 11 in the arrow B direction is restricted. In this state, the screw head 18 is rotated in the tightening direction, and the externally threaded portion 18b is tightened into the internally threaded portion 12b of the screw body 11 and fastened. When the screw head 18 is to be tightened, the counterforce can be sufficiently received from the frame 4 via the rod portion 41, and the screw head 18 can be smoothly and sufficiently tightened without being bothered by the co-rotation.

The present embodiment described above exerts the following effects. A maintenance method for the injection molding machine according to the present embodiment includes, at the time of attaching and detaching the screw 10 with respect to the screw drive unit 21, mounting, on the screw drive unit 21, the jig 40 configured to come into contact with the frame 4 of the main body 3 of the injection molding machine 2 by rotation of the screw drive unit 21 and to restrict further rotation of the screw drive unit 21; and tightening or loosening the bolts 30 with respect to the internally threaded portions 23a of the screw drive unit 21 while the jig 40 is in contact with the frame 4.

This feature makes it possible to reliably and safely reduce or prevent the co-rotation of the screw drive unit 21 when the bolts 30 are tightened and loosened, thereby enabling smooth tightening and loosening operation of the bolts 30.

A maintenance method for an injection molding machine according to the present embodiment includes, at the time of attaching and detaching the screw head 18 with respect to the screw body 11, mounting, on the fixation bush 25, the jig 40 configured to come into contact with the frame 4 of the main body 3 of the injection molding machine 2 by rotation of the fixation bush 25 and to restrict further rotation of the fixation bush 25; and tightening and loosening the externally threaded portion 18b of the screw head 18 with respect to the internally threaded portion 12b of the screw body 11 while the jig 40 is in contact with the frame 4.

This feature makes it possible to reliably and safely reduce or prevent the co-rotation of the screw body 11 when the screw head 18 is tightened and loosened, thereby enabling smooth tightening and loosening operation of the screw head 18.

The injection molding unit 1 according to the present embodiment includes the main body 3, the screw 10 for injection molding, the screw drive unit 21 that is rotatably supported on the main body 3 and configured to at least rotationally drive the screw 10, the fixation bush 25 that fixes the screw 10 to the screw drive unit 21, the plurality of bolts 30 that is rotatable about the axis substantially parallel to the rotation axis J of the screw drive unit 21 and tightened into the plurality of internally threaded portions 23a provided in the screw drive unit 21, the bolts 30 being rotated in the tightening direction to fix the screw 10 to the screw drive unit 21, and the jig 40 that is detachably mountable on the screw drive unit 21 and configured to come into contact with the frame 4 of the main body 3 by rotation of the screw drive unit 21 and to restrict further rotation of the screw drive unit 21, and the screw drive unit 21 includes the internally threaded portion 21a on which the jig 40 is detachably mounted.

This feature makes it possible to reliably and safely reduce or prevent the co-rotation of the screw drive unit 21 when the bolts 30 are tightened and loosened, thereby enabling smooth tightening and loosening operation of the bolts 30.

The injection molding unit 1 according to the present embodiment includes the main body 3, the screw 10 for injection molding, the screw drive unit 21 that is rotatably supported on the main body 3 and configured to at least rotationally drive the screw 10, and the fixation bush 25 that fixes the screw 10 to the screw drive unit 21, the screw 10 includes the screw body 11 that engages with the fixation bush 25 so as to rotate integrally with the fixation bush 25, the screw body being connected to the screw drive unit 21, and the screw head 18 that is rotatable about the axis substantially parallel to the rotation axis J of the screw body 11, and tightened into the internally threaded portion 12b provided in the end portion of the screw body 11, the injection molding unit includes the jig 40 that is detachably mountable on the fixation bush 25 and configured to come into contact with the frame 4 of the main body 3 by rotation of the fixation bush 25 and to restrict further rotation of the fixation bush 25, and the fixation bush 25 includes the internally threaded portion 25b on which the jig 40 is detachably mounted.

This feature makes it possible to reliably and safely reduce or prevent the co-rotation of the screw body 11 when the screw head 18 is tightened and loosened, thereby enabling smooth tightening and loosening operation of the screw head 18.

The jig 40 according to the present embodiment includes the externally threaded portion 42 that is detachably mountable on the internally threaded portion 21a provided in the screw drive unit 21 of the injection molding machine 2, and the rod portion 41 that extends from the externally threaded portion 42 and is configured to come into contact with the frame 4 of the main body 3 by rotation of the screw drive unit 21 and to restrict further rotation of the screw drive unit 21.

This feature makes it possible to reliably and safely reduce or prevent the co-rotation of the screw drive unit 21 when the bolts 30 are tightened and loosened, thereby enabling smooth tightening and loosening operation of the bolts 30. The jig 40 can be easily attached to and detached from the screw drive unit 21 by tightening and removing the externally threaded portion 42 into and from the internally threaded portion 21a of the screw drive unit 21. The jig 40 can be easily brought into a state in which the rod portion 41 is in contact with the frame 4 of the main body 3 and thereby restricts the rotation of the screw drive unit 21 simply by tightening the externally threaded portion 42 into the internally threaded portion 21a of the screw drive unit 21.

The jig 40 according to the present embodiment includes the externally threaded portion 42 that is detachably mountable on the internally threaded portion 25b provided in the fixation bush 25 of the injection molding machine 2, and the rod portion 41 that extends from the externally threaded portion 42, the rod portion 41 being configured to come into contact with the frame 4 of the main body 3 by rotation of the fixation bush 25 and to restrict further rotation of the fixation bush 25.

This feature makes it possible to reliably and safely reduce or prevent the co-rotation of the screw body 11 when the screw head 18 is tightened and loosened, thereby enabling smooth tightening and loosening operation of the screw head 18. The jig 40 can be easily attached to and detached from the fixation bush 25 by tightening and removing the externally threaded portion 42 into and from the internally threaded portion 25b of the fixation bush 25. The jig 40 can be easily brought into a state in which the rod portion 41 is in contact with the frame 4 of the main body 3 and thereby restricts the rotation of the fixation bush 25 simply by tightening the externally threaded portion 42 into the internally threaded portion 25b of the fixation bush 25.

Next, modifications of the jig 40 of the above embodiment will be described with reference to FIGS. 7 to 9. In the following description, the same components as in the above embodiment are denoted with the same reference numerals, the description will not be made or will be simplified, and differences will mainly be described.

Figure 7:
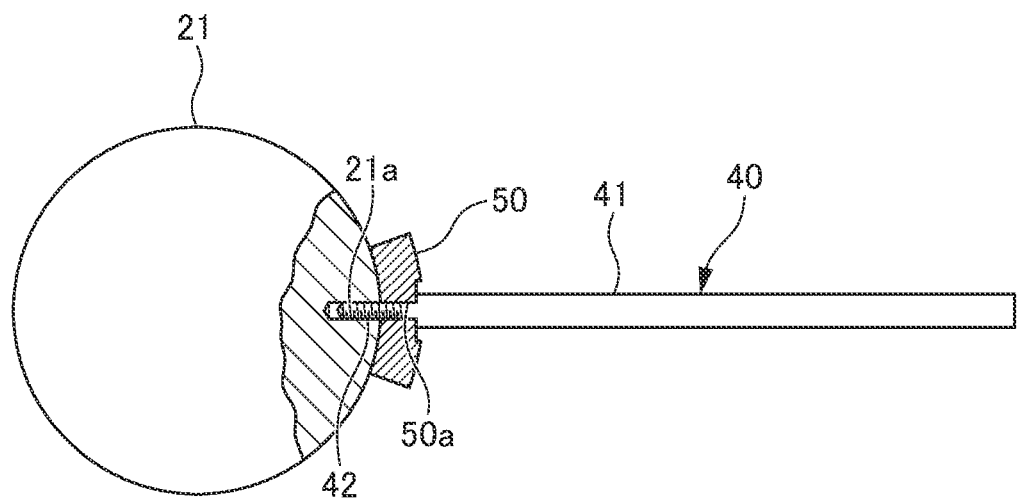
FIG. 7 is a partial cross-sectional front view showing a state where a maintenance jig according to a first modification is mounted on a screw drive unit.

FIG. 7 shows a state where a jig 40 according to a first modification is mounted on a internally threaded portion 21a of a screw drive unit 21. The jig 40 includes a rod portion 41 and an externally threaded portion 42, and further includes a support portion 50. The support portion 50 is constituted by a member bent along a circumferential direction of an outer peripheral surface of the screw drive unit 21 and has an inner peripheral surface extending along and being in contact with the outer peripheral surface of the screw drive unit 21. The support portion 50 has a through hole 50a extending from the inner peripheral surface to the outer peripheral surface.

The jig 40 is mounted on the screw drive unit 21 by tightening the externally threaded portion 42 extending through the through hole 50a into the internally threaded portion 21a and fastening the support portion 50 to the screw drive unit 21. The rod portion 41 has an end in contact with the outer peripheral surface of the support portion 50. The support portion 50 is disposed between the externally threaded portion 42 and the rod portion 41 and extends in the circumferential direction of the screw drive unit 21, that is, in a rotating direction, and is provided in contact with the screw drive unit 21.

According to the jig 40 shown in FIG. 7, as described above, when the bolt 30 or the screw head 18 is tightened and loosened while the rod portion 41 is in contact with the frame 4 of the main body 3, a counterforce from the frame 4 is received by the support portion 50, and a load applied to the externally threaded portion 42 can be reduced. For this reason, deformation of the externally threaded portion 42 can be prevented or reduced. Since the support portion 50 extends in the rotating direction of the screw drive unit 21, the jig 40 is less likely to shake, and fixing strength to the screw drive unit 21 can be increased.

Figure 8:
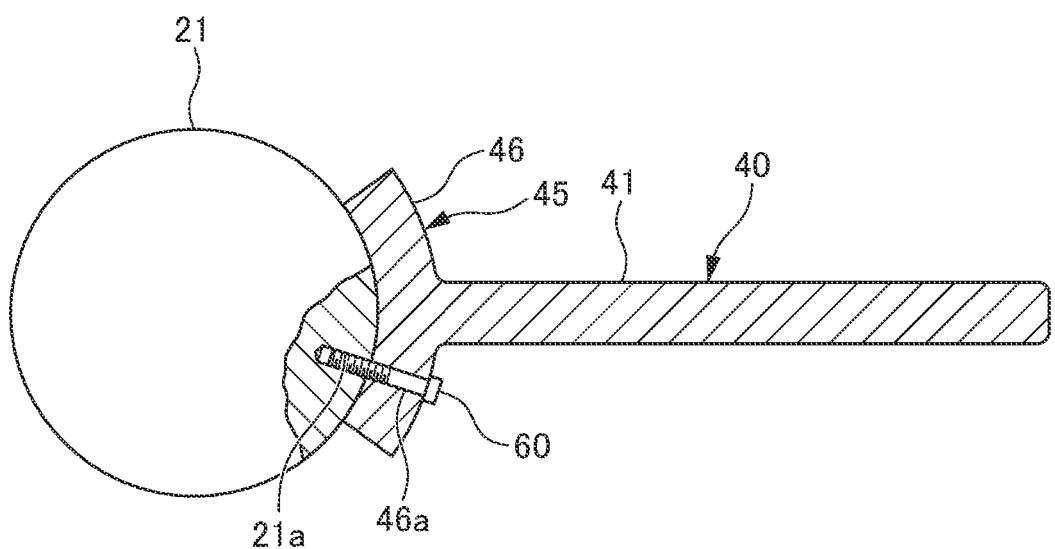
FIG. 8 is a partial cross-sectional front view showing a state where a maintenance jig according to a second modification is mounted on a screw drive unit.

FIG. 8 shows a state where a jig 40 according to a second modification is mounted on a internally threaded portion 21a of a screw drive unit 21. The jig 40 includes a mountable portion 45. The mountable portion 45 includes a fixing contact portion 46 integrated with a rod portion 41, disposed in contact with an outer peripheral surface of the screw drive unit 21 and having an arc shape, and one fixing bolt 60 that extends through the fixing contact portion 46 to be tightened and coupled into the internally threaded portion 21a. The fixing contact portion 46 has a through hole 46a through which the fixing bolt 60 extends. The fixing contact portion 46 extends in a circumferential direction (that is, a rotating direction) of the screw drive unit 21. The rod portion 41 extends in a radial direction from a circumferential central portion of the fixing contact portion 46.

Figure 9:
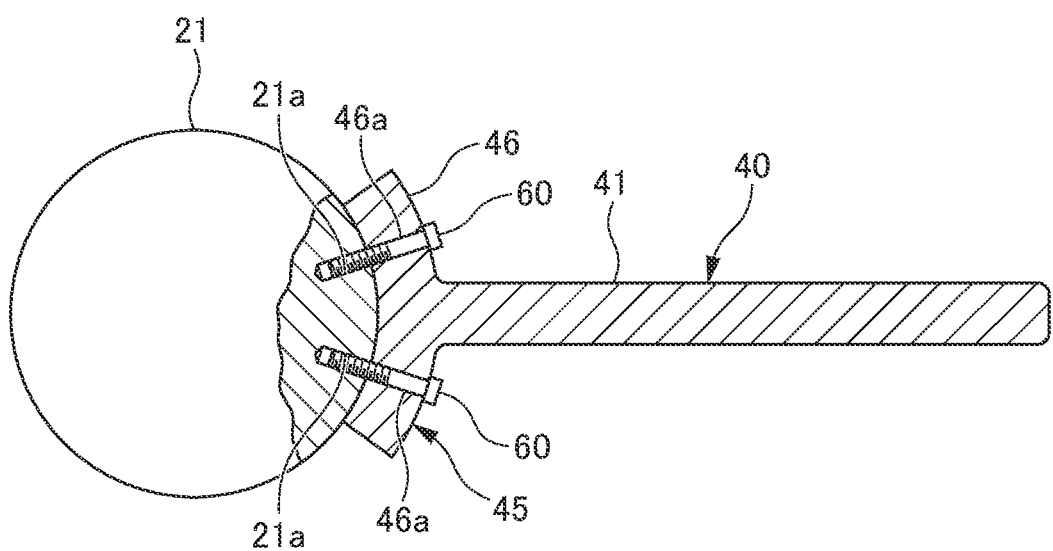
FIG. 9 is a partial cross-sectional front view showing a state where a maintenance jig according to a third modification is mounted on a screw drive unit.

FIG. 9 shows a state where a jig 40 according to a third modification is mounted on a internally threaded portion 21a of a screw drive unit 21. The jig 40 corresponds to the second modification shown in FIG. 8, and includes two fixing bolts 60 with which a fixing contact portion 46 is mounted to the screw drive unit 21. The fixing contact portion 46 includes two through holes 46a through which the fixing bolts 60 penetrate, respectively. The two through holes 46a are separated in a circumferential direction. Correspondingly, two internally threaded portions 21a are formed in the screw drive unit 21.

The jig 40 shown in each of FIGS. 8 and 9 is mounted on the screw drive unit 21 by tightening, into each internally threaded portion 21a, the fixing bolt 60 extending through the through hole 46a and fixing the fixing contact portion 46 to the screw drive unit 21.

According to the jig 40 shown in FIGS. 8 and 9, as described above, when the bolt 30 or the screw head 18 is tightened and loosened while the rod portion 41 is in contact with the frame 4 of the main body 3, a counterforce from the frame 4 is received by the fixing bolt 60 via the fixing contact portion 46. By providing the fixing bolt 60 with high strength, portions including the rod portion 41 and the fixing contact portion 46 can be made of inexpensive materials having a lower strength. Since the fixing contact portion 46 extends in the rotating direction of the screw drive unit 21, the jig 40 is less likely to shake, and fixing strength to the screw drive unit 21 can be increased. Since the jig 40 shown in FIG. 9 includes two fixing bolts 60, a load on the fixing bolts 60 is reduced, and for this reason, the fixing strength can be further increased without having to use fixing bolts 60 having a larger diameter.

Figure 10:
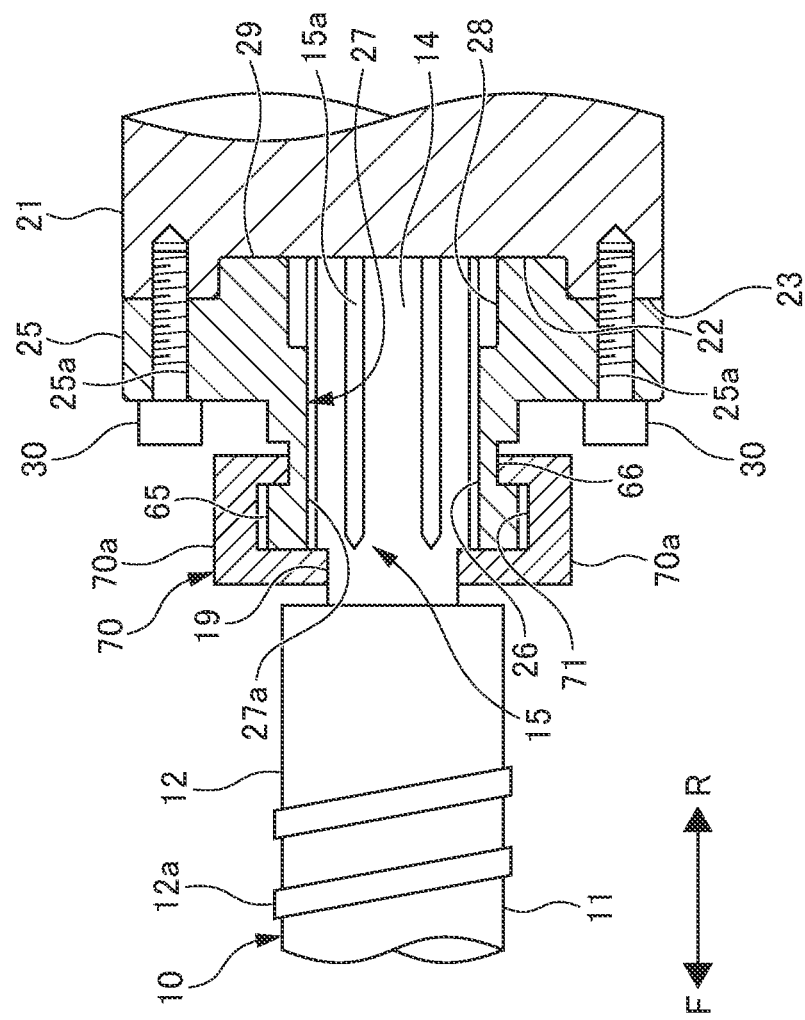
FIG. 10 is a partial cross-sectional side view showing another form of coupling structure that couples a screw to a screw drive unit.
Figure 11:
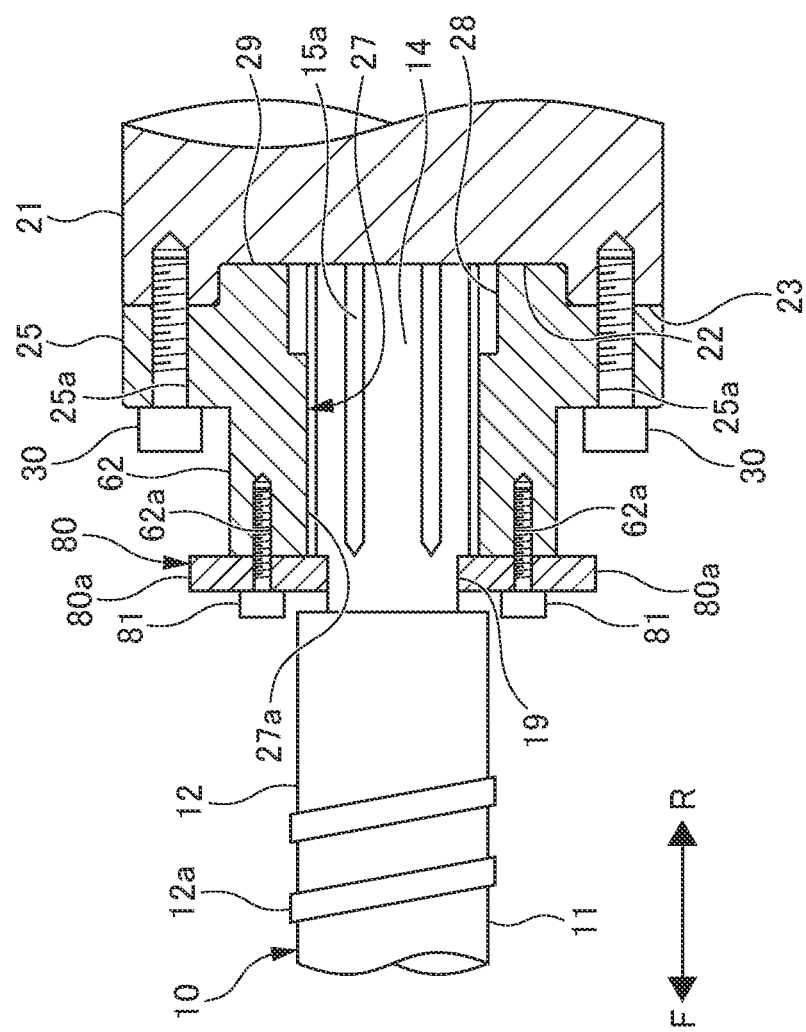
FIG. 11 is a partial cross-sectional side view showing still another form of coupling structure that couples a screw to a screw drive unit.

FIGS. 10 and 11 each show another form of coupling structure for coupling the screw 10 to the screw drive unit 21 in the injection molding machine 2 of the embodiment. In FIGS. 10 and 11, the same components as in the above embodiments are denoted with the same reference numerals and the description is not made. In the above-described embodiment, the screw 10 is retained by the retainer 17, but in the forms of FIGS. 10 and 11, screws 10 are retained by flanges 70 and 80, respectively.

The flange 70 shown in FIG. 10 is constituted by combining a pair of half bodies 70a dividable in a radial direction. A fixation bush 25, in a front part thereof, includes a collar portion 65 and a fitting groove 66 constituted by a circumferential groove in a front part. Each half body 70a includes an inner circumferential groove 71 that fits with the collar portion 65. The screw 10 includes a small-diameter portion 19 between a main body 12 and a base end portion 14. The inner circumferential groove 71 of each half body 70a is fitted and combined with the collar portion 65, and the half bodies 70a between which a screw 10 is sandwiched are coupled to each other with a fixture (not shown) such as a threaded fastener, thereby forming the flange 70. The flange 70 engages with the small-diameter portion 19 of the screw 10 and the fitting groove 66 of the fixation bush 25. The flange 70 retains the screw 10.

The flange 80 shown in FIG. 11 is constituted by combining of a pair of half bodies 80a dividable in a radial direction. A fixation bush 25 includes a cylindrical portion 62 in a front part. A plurality of internally threaded portions 62a is formed in a front end face of the cylindrical portion 62. A screw 10 includes a small-diameter portion 19 between a main body 12 and a base end portion 14. The half bodies 80a are fitted and combined with the small-diameter portion 19 of the screw 10, and bolts 81 inserted into the half bodies 80a between which the screw 10 is sandwiched are tightened into the internally threaded portions 62a and fixed to the fixation bush 25, thereby forming the flange 80. The flange 80 engages with the small-diameter portion 19 of the screw 10. The flange 80 retains the screw 10.

The present disclosure is not limited to the above embodiments and can be modified as appropriate. For example, the jig 40 is not limited to the configuration in which the jig is fixed to the screw drive unit 21 or the fixation bush 25 with the externally threaded portion 42. The jig 40 may be detachably mounted by inserting the jig into a hole provided in the screw drive unit 21 or the fixation bush 25, and is not particularly limited to fixing to the screw drive unit 21 or the fixation bush 25. The main body contact portion of the injection molding machine 2 with which the jig 40 is in contact is not limited to the frame 4 and may be any portion, provided that the portion is a stationary portion of the main body 3.

In a configuration in which the jig is detachably mounted on the fixation bush, the threaded fastener is not limited to one that rotates about the axis substantially parallel to the rotation axis of the screw drive unit to be tightened, and may rotate about another axis to be tightened. For example, in a case where the fixation bush is divided into two parts by a plane including a rotation axis of the screw drive unit, the threaded fastener may rotate about an axis perpendicular to the rotation axis of the screw drive unit to be tightened. In the above-described embodiment, the bolt 30 as a threaded fastener is configured to be mounted on both the screw drive unit 21 and the fixation bush 25, but is not limited to thereto. The bolt may be configured to be mounted on the screw drive unit 21 or the fixation bush 25.

EXPLANATION OF REFERENCE NUMERALS

1: injection molding unit
2: injection molding machine
3: main body
4: frame (main body contact portion)
10: screw
11: screw body
12b: internally threaded portion (second threaded portion)
18: screw head
21: screw drive unit
21a: internally threaded portion (receiving portion of the screw drive unit)
23a: internally threaded portion (first threaded portion)
25: fixation bush
25b: internally threaded portion (receiving portion of the fixation bush)
30: bolt (threaded fastener)
40: jig for maintenance
41: rod portion (restricting portion)
42: externally threaded portion (mountable portion)
46: fixing contact portion
50: support portion
60: fixing bolt (threaded fastener)

The invention claimed is:

1. A maintenance method for an injection molding machine, the injection molding machine including:
a main body,
a screw for injection molding,
a screw drive unit that is rotatably supported on the main body and configured to at least rotationally drive the screw,
a fixation bush that fixes the screw to the screw drive unit, and
a threaded fastener that is rotatable about an axis substantially parallel to a rotation axis of the screw drive unit, and tightened into a first threaded portion provided in the screw drive unit,
the screw being fixed to the screw drive unit through the fixation bush by the threaded fastener tightened into the first threaded portion,
the maintenance method comprising:
mounting a jig that is detachably mountable on the screw drive unit, the jig being configured to come into contact with a main body contact portion of the main body by rotation of the screw drive unit and to restrict further rotation of the screw drive unit; and
tightening and loosening the threaded fastener with respect to the first threaded portion while the jig is in contact with the main body contact portion,
wherein the jig comprises:
a mountable portion that is detachably mountable on a receiving portion provided on an outer peripheral surface of the screw drive unit; and
a restricting portion that extends from the mountable portion in a radial direction of the screw drive unit, the restricting portion being configured to come into contact with the main body contact portion of the main body by rotation of the screw drive unit and to restrict further rotation of the screw drive unit.

2. A maintenance method for an injection molding machine, the injection molding machine including:
a main body,
a screw for injection molding,
a screw drive unit that is rotatably supported on the main body and configured to at least rotationally drive the screw, and
a fixation bush that fixes the screw to the screw drive unit,
the screw including:
a screw body that engages with the fixation bush so as to rotate integrally with the fixation bush, the screw body being connected to the screw drive unit through the fixation bush, and
a screw head that is rotatable about an axis substantially parallel to a rotation axis of the screw body, and tightened into a second threaded portion provided in an end portion of the screw body,
the maintenance method comprising:
mounting a jig that is detachably mountable on the fixation bush, the jig being configured to come into contact with a main body contact portion of the main body by rotation of the fixation bush and to restrict further rotation of the fixation bush; and
disconnecting the fixation bush from the screw drive unit and tightening and loosening the screw head with respect to the second threaded portion while the jig is in contact with the main body contact portion,
wherein the jig comprises:
a mountable portion that is detachably mountable on a receiving portion provided on an outer peripheral surface of the fixation bush, and
a restricting portion that extends from the mountable portion in a radial direction of the fixation bush, the restricting portion being configured to come into contact with the main body contact portion of the main body by rotation of the fixation bush and to restrict further rotation of the fixation bush.

3. An injection molding unit comprising:
a main body;
a screw for injection molding;
a screw drive unit that is rotatably supported on the main body and configured to at least rotationally drive the screw;

a fixation bush that fixes the screw to the screw drive unit;
a threaded fastener that is rotatable about an axis substantially parallel to a rotation axis of the screw drive unit, and tightened into a first threaded portion provided in the screw drive unit, the threaded fastener being rotated in a tightening direction to fix the screw to the screw drive unit through the fixation bush; and
a jig that is detachably mountable on the screw drive unit, the jig being configured to come into contact with a main body contact portion of the main body by rotation of the screw drive unit and to restrict further rotation of the screw drive unit,
the screw drive unit including a receiving portion on which the jig is detachably mounted,
wherein the jig comprises:
a mountable portion that is detachably mountable on the receiving portion provided on an outer peripheral surface of the screw drive unit; and
a restricting portion that extends from the mountable portion in a radial direction of the screw drive unit, the restricting portion being configured to come into contact with the main body contact portion of the main body by rotation of the screw drive unit and to restrict further rotation of the screw drive unit.

4. An injection molding unit comprising:
a main body;
a screw for injection molding;
a screw drive unit that is rotatably supported on the main body and configured to at least rotationally drive the screw; and
a fixation bush that fixes the screw to the screw drive unit, the screw including:
a screw body that engages with the fixation bush so as to rotate integrally with the fixation bush, the screw body being connected to the screw drive unit through the fixation bush, and
a screw head that is rotatable about an axis substantially parallel to a rotation axis of the screw body, and tightened into a second threaded portion provided in an end portion of the screw body,
the injection molding unit further comprising: a jig that is detachably mountable on the fixation bush, the jig being configured to come into contact with a main body contact portion of the main body by rotation of the fixation bush and to restrict further rotation of the fixation bush,
the fixation bush including a receiving portion on which the jig is detachably mounted,
wherein the jig comprises:
a mountable portion that is detachably mountable on the receiving portion provided on an outer peripheral surface of the screw drive unit; and
a restricting portion that extends from the mountable portion in a radial direction of the screw drive unit, the restricting portion being configured to come into contact with the main body contact portion of the main body by rotation of the screw drive unit and to restrict further rotation of the screw drive unit.

5. A maintenance jig for an injection molding machine, the maintenance jig being provided to the injection molding machine including:
a main body,
a screw for injection molding,
a screw drive unit that is rotatably supported on the main body and configured to at least rotationally drive the screw,
a fixation bush that fixes the screw to the screw drive unit, and
a threaded fastener that is rotatable about an axis substantially parallel to a rotation axis of the screw drive unit, and tightened into a first threaded portion provided in the screw drive unit,
the screw being fixed to the screw drive unit through the fixation bush by tightening the threaded fastener into the first threaded portion,
the maintenance jig comprising:
a mountable portion that is detachably mountable on a receiving portion provided on an outer peripheral surface of the screw drive unit; and
a restricting portion that extends from the mountable portion in a radial direction of the screw drive unit, the restricting portion being configured to come into contact with a main body contact portion of the main body by rotation of the screw drive unit and to restrict further rotation of the screw drive unit.

6. A maintenance jig for an injection molding machine, the maintenance jig being provided to the injection molding machine including:
a main body,
a screw for injection molding,
a screw drive unit that is rotatably supported on the main body and configured to at least rotationally drive the screw, and
a fixation bush that fixes the screw to the screw drive unit, the screw including:
a screw body that engages with the fixation bush so as to rotate integrally with the fixation bush, the screw body being connected to the screw drive unit through the fixation bush, and
a screw head that is rotatable about an axis substantially parallel to a rotation axis of the screw body, and tightened into a second threaded portion provided in an end portion of the screw body,
the maintenance jig comprising:
a mountable portion that is detachably mountable on a receiving portion provided on an outer peripheral surface of the fixation bush, and
a restricting portion that extends from the mountable portion in a radial direction of the fixation bush, the restricting portion being configured to come into contact with a main body contact portion of the main body by rotation of the fixation bush and to restrict further rotation of the fixation bush.

7. The maintenance jig for an injection molding machine according to claim 5, further comprising, between the mountable portion and the restricting portion, a support portion that extends in a rotating direction of the receiving portion, the support portion supporting a counterforce received by the restricting portion from the main body contact portion.

8. The maintenance jig for an injection molding machine according to claim 5,
wherein the mountable portion includes:
a fixing contact portion integrated with the restricting portion, the fixing contact portion being disposed in contact with the receiving portion, and
at least one fixing bolt that extends through the fixing contact portion to be tightened and coupled to the receiving portion.

9. The maintenance jig for an injection molding machine according to claim 8, wherein the fixing contact portion extends in a rotating direction of the screw drive unit.

* * * * *